United States Patent [19]

Oest

[11] Patent Number: 5,660,379
[45] Date of Patent: Aug. 26, 1997

[54] PNEUMATIC SPRING

[76] Inventor: Burkhard Oest, Wildewiese 6, 59846 Sundern-Wildewiese, Germany

[21] Appl. No.: 541,496

[22] Filed: Oct. 10, 1995

[30] Foreign Application Priority Data

Oct. 8, 1994 [DE] Germany ............................ 44 36 028.2

[51] Int. Cl.$^6$ ............................... F16F 9/18; B21D 26/14
[52] U.S. Cl. ........................ 267/126; 267/137; 267/119; 72/351
[58] Field of Search ....................... 267/64.11, 64.22, 267/64.25, 64.28, 118, 119, 124–126, 130; 188/322.11, 322.21; 92/146; 72/350, 351, 453.13

[56] References Cited

U.S. PATENT DOCUMENTS

| 2,976,930 | 3/1961 | Marquis et al. | 267/125 |
| 2,989,019 | 6/1961 | Van Scriver | 72/351 |
| 3,160,111 | 12/1964 | Berry | 267/125 |
| 3,256,782 | 6/1966 | Ebert | 92/146 |
| 3,636,749 | 1/1972 | Heiser | 72/351 |
| 4,039,176 | 8/1977 | Jansen | 267/125 |
| 4,699,043 | 10/1987 | Dionigi | 92/146 |
| 4,934,230 | 6/1990 | Wallis | 267/119 |
| 5,129,635 | 7/1992 | Holley | 267/64.26 |
| 5,167,181 | 12/1992 | Lee | 92/71 |
| 5,431,087 | 7/1995 | Kambara | 92/146 |

FOREIGN PATENT DOCUMENTS 3814568   9/1989   Germany .

*Primary Examiner*—Robert J. Oberleitner
*Assistant Examiner*—Chris Schwartz
*Attorney, Agent, or Firm*—Collard & Roe, P.C.

[57] ABSTRACT

A pneumatic spring for damping movement of a machine part having a guide shaft for performing a stroke. The spring includes a housing containing gas. The housing is formed as a stationary body with a central opening adapted to accommodate the guide shaft. Several cylindrical bores are formed within the stationary body. A piston is peripherally guided within each cylindrical bore. Each piston has a center point located on a circle which is concentrically oriented with the central opening. The pistons contact the machine part with an upper support end so that all the pistons jointly perform a stroke with the machine part. Alternatively, the cylindrical bores are selectively equipped with sealing disks instead of pistons, to adjust the resistance force characteristic of the spring.

10 Claims, 4 Drawing Sheets

PNEUMATIC SPRING

BACKGROUND OF THE INVENTION

1. Field of the Invention

The present invention relates to a pneumatic spring with at least one movable piston. More particularly, it relates to a pneumatic spring having a stationary body with a center opening to accommodate a guide shaft or the like.

2. The Prior Art

Gas pressure springs are known, for example from DE-OS 38 14 568. In the previous gas pressure springs, the ring space, defined by an outer cylinder and an inner cylinder, is divided into an upper annular work space and a lower annular work space. These spaces are connected to each other by bores in the piston ring. The two work spaces are filled with a dampening liquid. Additionally, a gas-filled compensation space is provided. This compensation space is separated from the work space by a separating piston. Since a divided work space filled with dampening liquid is used in addition to the gas pressure space, the device has a relatively large axial structural height in relation to the diameter. Therefore, it is not possible to use gas pressure springs for replacing a conventional cup spring. Cup springs are used, for example, when two plates of a tool are performing a stroke against each other and against a spring force. Such a tool also requires a free space for a center guide element such as a guide shaft extending through the spring.

SUMMARY OF THE INVENTION

It is therefore an object of the present invention to overcome the drawbacks of the prior art and to provide a pneumatic spring having dimensions suitable to replace a cup spring column or a cup spring package.

These and other related objects are achieved according to the invention by a pneumatic spring for damping movement of a machine part having a guide shaft for performing a stroke. The pneumatic spring includes a housing with a pressure chamber containing gas. The housing comprises a stationary body with a central opening adapted to accommodate the guide shaft and a plurality of cylindrical bores formed therein. A plurality of pistons are provided with each piston having a center point located on the circle which is concentrically oriented with the central opening and a supporting end. Each piston is axially movable within the pressure chamber against the spring force of the gas contained therein. Each piston is guided peripherally within one of the cylindrical bores. The pistons contact the machine part with the support ends so that the plurality of pistons jointly perform a stroke with the machine part.

No provision is made for a dampening liquid. The pneumatic spring according to the invention has a comparatively low axial structural height in relation to the diameter. Since an open center space is provided for the passage of a guide shaft or the like, the pneumatic spring according to the invention can be used to replace a cup spring column, i.e., a cup spring column can be directly replaced by such a pneumatic spring without having to make any constructional changes. The stroke of the pneumatic spring is also relatively large compared to the axial constructional height. The spring characteristic of the pneumatic spring can be altered by varying the initial gas pressure in the cylindrical pressure chambers of the individual pistons.

Each piston has a central, axially-extending cylindrical aperture with an open end facing the pressure chamber. The spring further includes a gas expansion chamber with a radially-extending pipe and bore connecting the pressure chamber to the gas expansion chamber. The pressure chamber comprises a plurality of cylindrical pressure chambers corresponding to the piston and connected to each other.

Therefore, during the stroke, the gas can partly flow from the pressure space and is, therefore, not exclusively compressed in the pressure space. The spring characteristic of the pneumatic spring can be varied in this way. If a pre-pressure is selected in the pressure space, a spring force (nominal force) is already present at the beginning of the stroke. The spring characteristic of a pneumatic spring according to the invention can be selected so that it is almost linear. As opposed to a conventional cup spring, no material fatigue occurs in connection with the pneumatic spring. An inert gas, for example nitrogen, is used as the pressure gas.

The spring further includes a plurality of cylindrical disks for sealing the lower extent of the respective pressure chambers and defining a lower stop for the pistons. Each disk optionally includes a valve for selectively adjusting the pressure within each cylindrical pressure chamber. A plurality of connection ducts connect the pressure chambers together. Each connection duct extends radially from the central opening between two adjacent pressure chambers. Each connection duct tangentially intersects the two adjacent pressure chambers. A plurality of duct caps are provided for sealing the plurality of connection ducts. The various pressure chambers are in communication with each other. At least one pressure chamber is sealed with a sealing disk with the remainder of the pressure chambers being equipped with a piston, wherein the ratio of sealing disks to pistons determines the resistance force characteristics of the pneumatic spring.

The pneumatic spring according to the invention provides a circular active surface formed by a plurality of small, annularly arranged circular surfaces. These small surfaces are arranged around the guide element, as with a conventional cup spring, whereas a conventional pneumatic spring has a single cylindrical pressure piston with one circular active surface. According to an alternate embodiment of the invention, it is possible to use one single ring piston instead of several, small circularly arranged pistons. With this variation, the pressure space below the ring piston is ring-shaped as well.

Furthermore, the use of a plurality of small pistons, whose center points are concentrically arranged on a circle around the stationary housing of the pneumatic spring has the advantage that the pneumatic spring still operates even if the two construction parts performing the stroke tilt with respect to each other. If such tilting occurs, the pneumatic spring provides significantly better compensation than conventional pneumatic springs. Since several smaller annularly arranged pistons are used, even if one piston fails due to tilting, the other pistons are still capable of operating.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
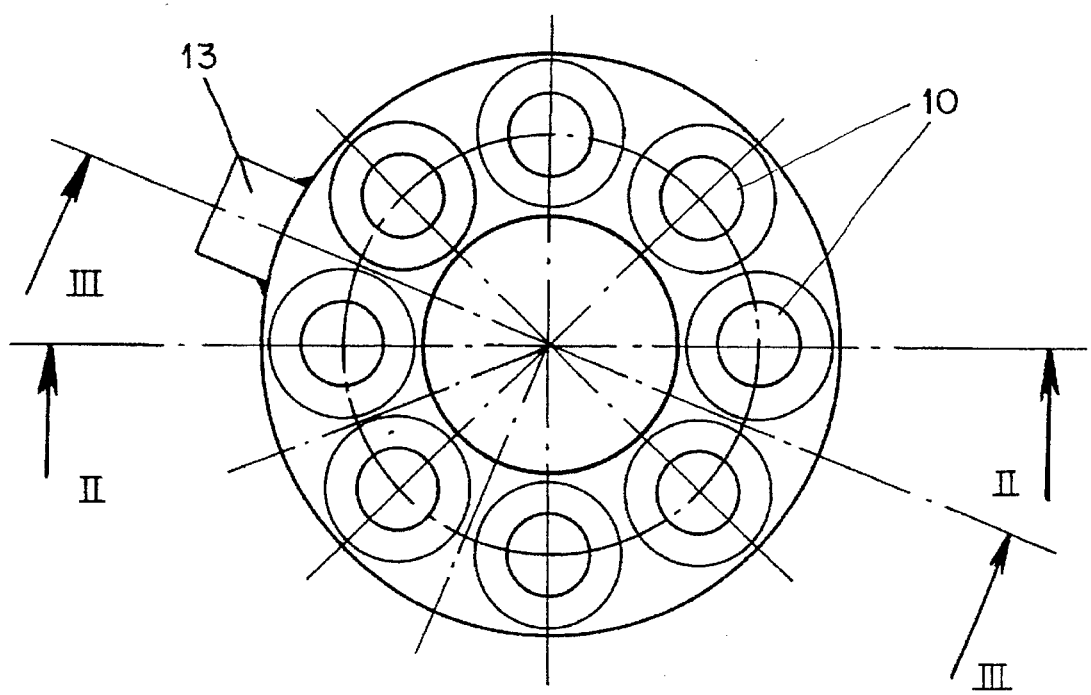
FIG. 1 is a top plan view of a pneumatic spring according to the invention.
Figure 2:
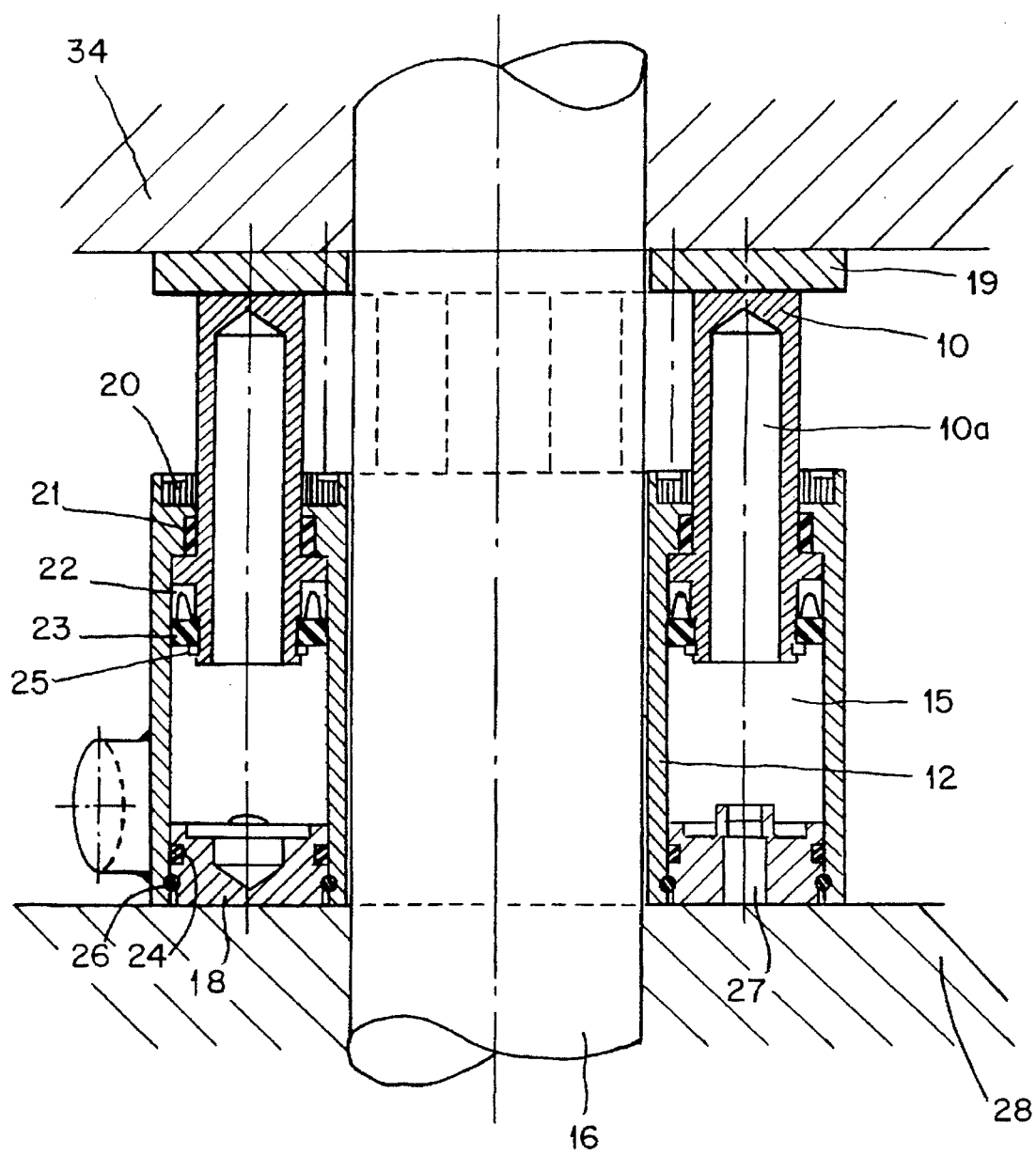
FIG. 2 is a cross-sectional view of the pneumatic spring taken along the line II—II from FIG. 1.

Referring now in detail to the drawings, and in particular, FIGS. 1 and 2, there is shown a pneumatic spring according to the invention for cushioning movement between two construction parts which perform a stroke against each other. These parts are a top tool plate 34 and a bottom tool plate 28, for example. The pneumatic spring has a stationary housing 12 with a center opening for the passage of a axially-extending guide shaft 16. A plurality of pistons 10, are arranged in a circle which is concentric with the center opening of the stationary housing 12. In the present exemplified embodiment, eight pistons 10 are shown, for example. These pistons jointly perform the stroke and have their center points arranged along a circle. FIG. 2 shows a cylindrical pressure chamber 15 for each piston 10, which serves as the piston work space. Each piston 10 also has a center axial, cylindrical hollow space 10a, is open at its lower end to face pressure chamber 15. The top surface of the individual pistons 10 is slightly crowned in each case, which compensates for any alignment flaw between the top tool plate 34 and the bottom tool plate 28, whereby the individual pistons 10 are capable of springing independently of each other.

FIG. 2 also shows a filling valve 27 for filling pressure chambers 15 with gas. The pre-pressure within each cylindrical pressure chamber 15 may be changed to alter spring characteristic of the pneumatic spring.

Figure 3:
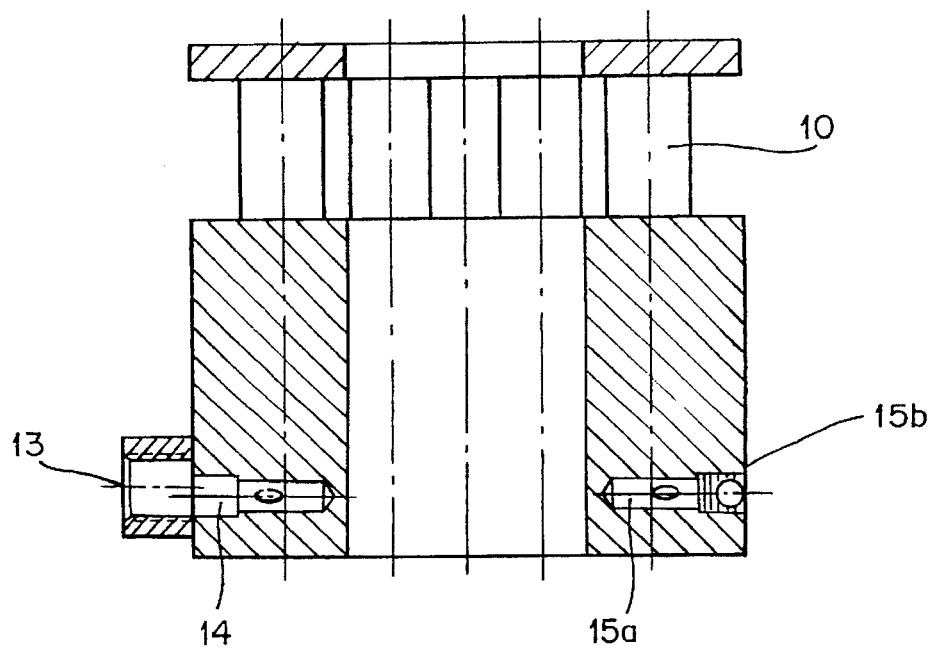
FIG. 3 is a cross-sectional view of the pneumatic spring taken along the line III—III from FIG. 1.
Figure 4:
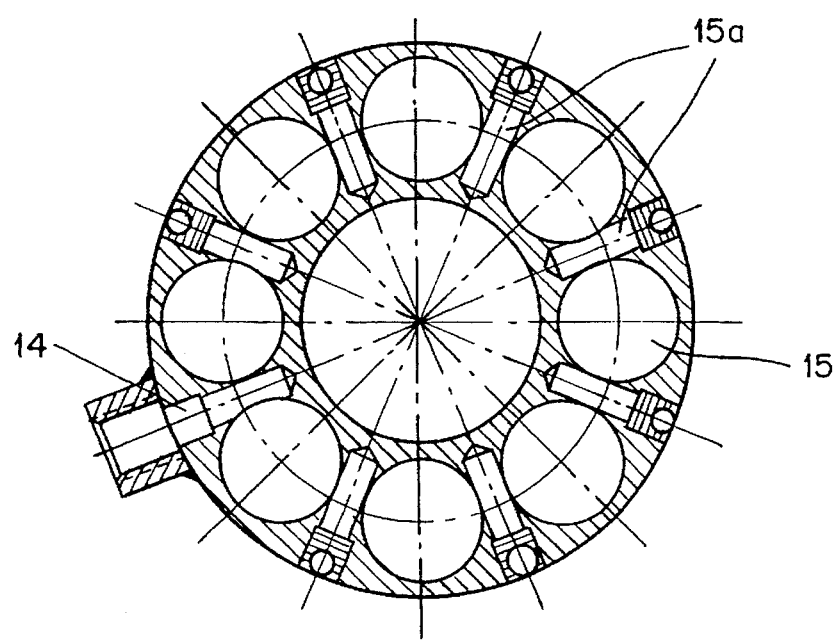
FIG. 4 shows a cross section through the pneumatic spring viewed from the underside.

FIGS. 1, is and 4 show a connection pipe 13 with a bore 14 extending radially inwardly between adjacent pressure chambers 15. The pressure chamber 15 can be connected via connection pipe 13 to a further pressure compensation device or space (not shown for the sake of clarity) in order to permit gas to flow out when the piston 10 is lowered and to produce a softer spring characteristic. The pressure compensation device may be in the form of a gas expansion chamber. Furthermore, the pressure chambers 15 of the individual pistons 10 are connected together via connection ducts 15a. Connection ducts 15a are disposed radially, with respect to the axis of the stationary housing 12 and the pneumatic spring, between two adjacent cylindrical pressure spaces 15 and tangentially intersect the adjacent pressure spaces laterally. FIG. 4 shows that with eight pistons, eight connection ducts 15a are present. One of connection ducts is connected to the pressure compensation space via radial bore 14. FIG. 3 is shows that the connection ducts 15a can be sealed against the outside by duct caps 15b.

As can be seen in FIG. 2, the top of pistons 10 are connected with the tool plate 34 via an optional pressure disk 19. Strippers 20 are arranged around the pistons 10 on the outside. Below strippers 20, the pistons are surrounded by guide rings 21, whereby additional guide rings 23 are arranged in the lower zone of pistons 10. Seals 22 are present above said guide rings 23. Thus each piston 10 is guided via guide rings 21 and 23 within its cylindrical space during the motion of the stroke, and the pressure chamber 15 is sealed upwardly. The cylindrical sealing disks 18 serve in each case as lower abutments for the pistons 10. Disks 18 are fastened via the retaining rings 26 in the wall of the stationary housing 12. Disks 18 are sealed on the outside by means of the sealing rings 24, for example, O-rings. The cylindrical disk 18 may be provided with blind bores, they may be closed on the face side, or they may be provided with a filling valve 27, shown on the right-hand side of FIG. 2.

Figure 5:
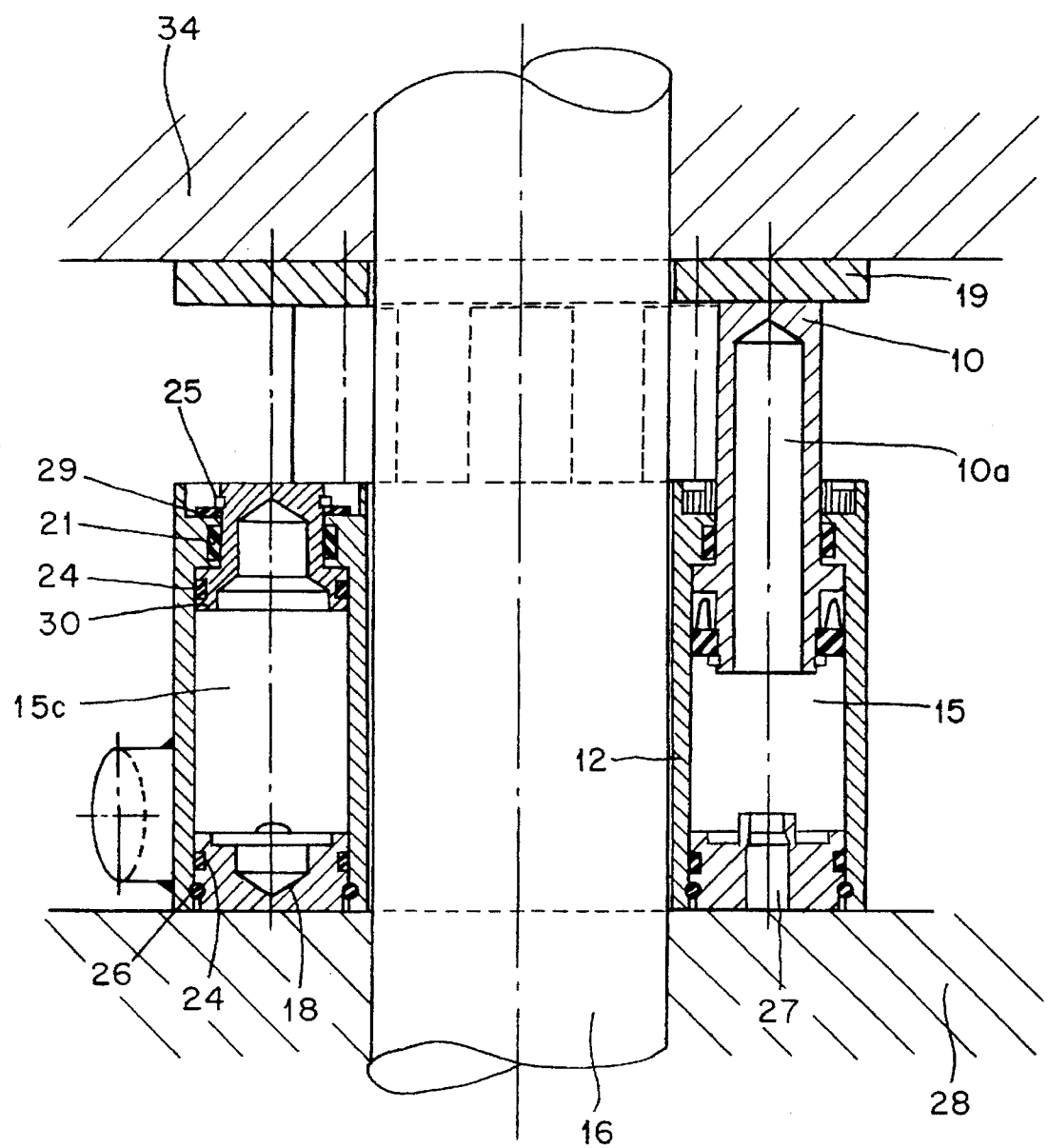
FIG. 5 is a cross-sectional view of an alternate embodiment of the pneumatic spring.

FIG. 5 shows an alternate embodiment of the invention. According to said variation, one or more pistons can be omitted and replaced in each case by a closing stopper 30. In this way, a cylindrical gas space 15c is obtained underneath said closing stopper, which is connected with pressure chambers 15 of the adjacent pistons 10 by way of the connection ducts 15a. This reduces the total force of the pneumatic spring depending on the number of pistons omitted. The force decreases since the total gas space is enlarged. Hence the pressure rise in the closed system is decreased during the stroke. No external pressure compensation space is used with this embodiment. However, the gas space 15c is available as a quasi-internal pressure compensation space. Preferably, opposite pistons are always replaced, so that the distribution of force remains balanced.

What is claimed is:

1. A pneumatic spring for damping movement of a machine part having a guide shaft for performing a stroke comprising:

a housing comprising a stationary body with (i) a central opening adapted to accommodate the guide shaft; and (ii) a plurality of cylindrical bores formed therein containing gas; and a plurality of pistons contained in said plurality of cylindrical bores, each piston having (i) a center point located on a circle and concentrically oriented around the central opening; and (ii) a supporting end;

each piston being axially movable within its respective cylindrical bore against a spring force of the gas contained therein, each piston being guided peripherally within its respective cylindrical bore;

wherein said plurality of pistons contact the machine part with said support ends so that said plurality of pistons jointly perform a unidirectional stroke with said machine part.

2. The spring according to claim 1, wherein each piston has a central, axially-extending cylindrical aperture with an open end.

3. The spring according to claim 1, comprising:

a radially-extending pipe and a radially-extending bore capable of connecting said cylindrical bores to a gas expansion chamber.

4. The spring according to claim 1, wherein said cylindrical bores are fluidly connected to each other.

5. The spring according to claim 4, comprising a plurality of cylindrical disks, with one disk sealing a lower extend of each cylindrical bore and defining a lower stop for the respective piston.

6. The spring according to claim 5, wherein each disk includes a valve for selectively adjusting the pressure within each cylindrical bore.

7. The spring according to claim 4, comprising a plurality of connection ducts for connecting said cylindrical bores together, each connection duct extends radially from the central opening between two adjacent cylindrical bores, each connection duct tangentially intersecting the two adjacent cylindrical bores.

8. The spring according to claim 7, comprising a plurality of duct caps for sealing said plurality of connection ducts.

9. The spring according to claim 1, wherein the pneumatic spring has a relatively low height in relation to it diameter and stroke length, whereby the pneumatic spring is configured to the dimensions of a conventional cup spring column or a cup spring package.

10. The spring according to claim 1, comprising several sealing disks; and said cylindrical bores are in communication with each other;

wherein at least one cylindrical bore is sealed by at least one of said sealing disks with the remainder of said cylindrical bores each being equipped with, one of said plurality of said pistons, wherein the ratio of sealing disks to pistons determines the resistance force characteristics of the pneumatic spring.

* * * * *